Dec. 18, 1934.  R. B. TAYLOR  1,984,709
PEELING KNIFE
Filed Oct. 31, 1932
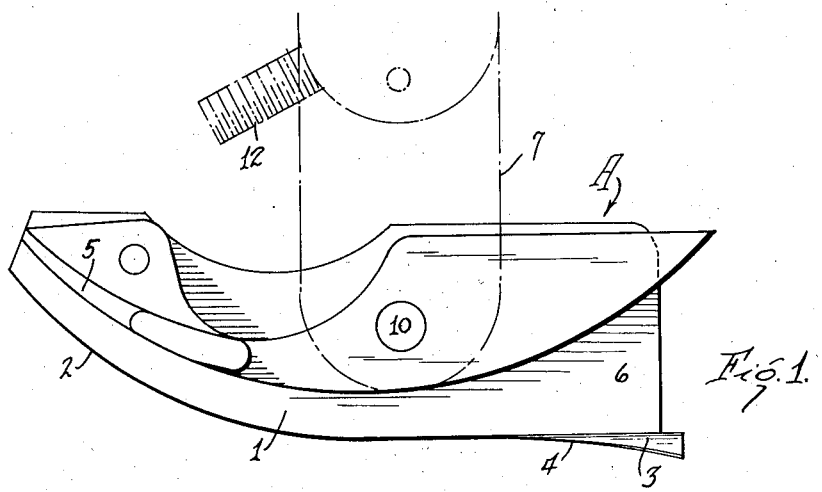
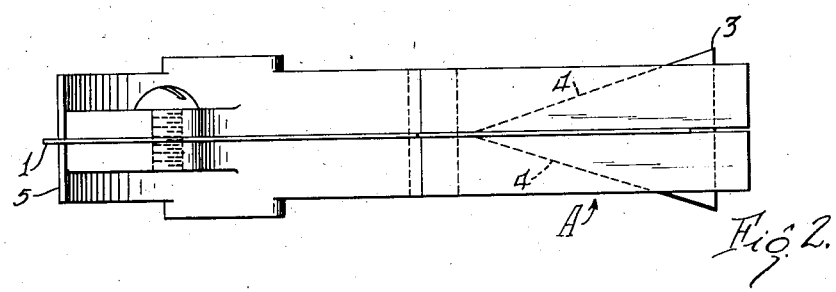
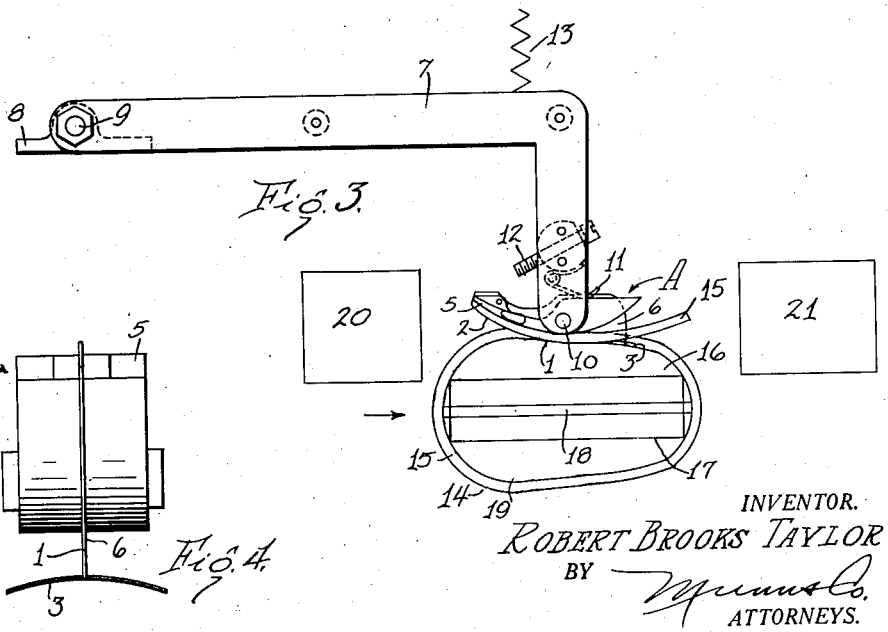
INVENTOR.
ROBERT BROOKS TAYLOR
BY
ATTORNEYS.

Patented Dec. 18, 1934

1,984,709

UNITED STATES PATENT OFFICE 1,984,709

PEELING KNIFE

Robert Brooks Taylor, Kapaa, Territory of Hawaii

Application October 31, 1932, Serial No. 640,521

6 Claims. (Cl. 146—6)

The present invention relates to improvements in peeling knives, and its principal object is to provide a peeling knife adapted to be used for peeling pineapples or similar fruit having a comparatively heavy shell. The conventional method of preparing pineapples for canning in the form of uniform slices is to first center the pineapple in a machine, to then cut out a cylindrical central portion of the pineapple corresponding in diameter to the size of the slice desired, to then cut off the ends of the cylinder, to core the latter, and to trim the edges of the cylinder for removal of such portions of the shell as adhere to the edges as a result of the operations set forth. This manner of preparing the pineapple leaves the ellipse-shaped portion of the shell with a considerable portion of the meat adhering thereto, and this meat is separated from the shell by different kinds of machinery which deliver the meat as a pulp sold on the market as crushed pineapple, and usually considered as of lower value and sold at prices much below those charged for the meat of the pineapple presented to the market in the form of uniform slices.

It is the object of my invention to reorganize this entire operation and to remove the shell from the pineapple in such a manner that that portion of the pineapple surrounding the cylindrical part may be cut into attractive tidbits which would be much more accessible to the market and would sell at higher prices than the crushed pineapple. This particular portion of the meat if properly recovered from the fruit shell is actually the best quality of the entire fruit.

In the present application it is not my object to describe the entire process but the present application will be confined to a particular tool used for separating the shell from the meat of the pineapple which will form an important part of my invention.

More particularly the present invention refers to a peeling knife adapted to remove the shell from the meat of the pineapple in the form of elongated strips extending from one end of the pineapple to the other so that practically the entire meat of the pineapple may be saved to be sold in the market in the form of shaped pieces instead of making it necessary to sell a portion of the meat as crushed pineapple.

It is further proposed in the present invention to provide a method for peeling pineapples which leaves the entire meat of the pineapple intact for cutting up into shaped pieces, whereby it becomes unnecessary to place a portion of the meat on the market in the form of crushed pineapple.

Further objects and advantages of my invention will appear as the specification proceeds.

The preferred form of my invention is illustrated in the accompanying drawing, in which Figure 1 shows a side view of my peeling knife with a fragmentary view of an attaching element, Figure 2 a plan view of the peeling knife, Figure 3 a side elevation showing my peeling knife and its attaching element in operative relation to a pineapple; and Figure 4 a rear view of my peeling knife.

While I have shown only the preferred form of my invention, it should be understood that various changes or modifications may be made within the scope of the claims hereto attached without departing from the spirit of the invention.

My peeling knife A comprises a blade 1 which may be made substantially rectangular in form with its lower front edge 2 rounded. This rounded edge may be sharpened to cut through the shell of the pineapple or it may be left unsharpened to merely follow a slit cut into the pineapple by an additional blade preceding the peeling knife, as shown in Figure 3 of the drawing. To the bottom edge of this blade is attached a second blade 3 which preferably projects from both sides of the first blade and extends from the rear end of the latter forwardly, the length of this blade being preferably only a fraction of that of the blade 1, and the front edges 4 of the second blade being tapered in the manner shown in the drawing. The second blade is preferably dished in cross-section as shown in Figure 4 to conform to the outline of the pineapple. The upper portion of the blade 1 has a guide 5 attached thereto, which latter projects from opposite sides of the blade 1 substantially throughout the length thereof. This guide serves as a shoe and runs parallel to the bottom or cutting edge of the blade 1 and in spaced relation thereto, the spacing corresponding substantially to the thickness of the pineapple shell, except in the rear portion where the spacing increases as shown at 6.

It should be understood that this peeling knife is adapted for operation by hand as well as for mounting in a suitable machine. When used as a machine I preferably use the mounting means illustrated in Figure 3 and comprising an elbow 7, the forward end of which is pivoted to a bracket 8 as shown at 9, while the rear end has the peeling knife pivoted therein as shown at 10. A spring 11 bears on the rear end of the knife and a screw 12 forms an adjustable stop for the front end of the peeling knife. A number of elbows 7, preferably twelve, may be arranged in circumferential order with freedom of radial movement, with yielding means, such as the springs 13, urging the peeling knife upon the pineapple, and the latter being guided through the knives in the direction of the arrow. In this case the knives are preferably spaced longitudinally so that only one knife becomes active on the pineapple at a time and fixed blades 20 are mounted ahead of the blades 1 and in alinement therewith to cut slits into the pineapple to the depth of the cylinder 17 so as to cut the meat of the pineapple to the depth of the cylinder and to relieve the peeling blades of the burden of actually cutting through the pineapple shell. These blades 20 may be continued as at 21, throughout the length of this portion of the machine to serve as a holding and guiding means for the pineapple during successive peeling operations.

The manner of operating my peeling knife and the method by which I propose to peel a pineapple is illustrated in Figure 3. The pineapple 14 is shown as substantially elliptical in form, with one end slightly heavier than the other. It consists of the shell 15 and the meat 16 confined within the shell. In conventional practice a central cylindrical portion 17 is separated from the remainder part of the meat and used for sliced pineapple. It is usually cored as shown at 18. The remainder of the meat surrounding the cylinder 17 and which is indicated at 19, in the conventional process adheres to the shell while the cylinder is removed and is separated later in the form of crushed pineapple and is placed on the market in that form.

In my method I reorganize the process by first cutting radial slits into the pineapple from the outside to the depth of the cylinder, then successively removing sections of the shell from one end to the other with the aid of my peeling knife and following the lines of the slits and then removing the cylindrical portion while simultaneously or successively cutting the elongated strips of the outer portion of the meat into tidbits.

When performed by hand, the operation may be described as follows: By the aid of an ordinary knife I cut a series of longitudinal slits in the pineapple, preferably about 12 and substantially to the depth of the cylinder 17. I then use my peeling knife and insert the blade 1 into one of the slits and follow the latter whereby the transverse blade is made to cut into the shell, to enter between the shell and the meat and to separate a portion of the shell on opposite sides of the slit from the meat of the pineapple. The guide 5 serves to limit the depth of penetration of the blade 3 so that the latter cuts immediately underneath the shell. I then insert the blade into the next slit and separate adjacent portions of the shell from the meat. The width of the blade 3 being proportioned to correspond to the width of the shell sections between the slits, one complete shell section, in the form of an elongated strip, has now been separated from the meat of the pineapple and will drop off or may be manually removed. A further cut with the peeling knife along the third slit will remove a second shell section or strip and so on. The last cut through the last slit will remove the last two shell sections.

I now have a pineapple from which the shell has been completely removed, except for some small end portions and which is slit longitudinally from the outer circumference to the depth of the cylinder 17. By means of a cylindrical knife commonly used in the pineapple industry I now separate the outer portion 19 of the meat from the cylinder 17, which latter, after removal of the ends, may be cut into slices for further canning operations. The outer portion 19 of the meat drops from the cylinder 17 in the form of elongated strips which may be cut up into tidbits, either during or after the last operation.

For machine operation I preferably mount a series of radial blades, one of which is shown at 20, in such a manner that when the pineapple is made to pass through the same, a corresponding number of slits are made in the pineapple to the depth of the cylinder 17. On advancing in the direction of the arrow the pineapple passes successively through the peeling knives, which follow the slits and successively remove elongated strips of the shell of the pineapple, the second knife removing the first strip and the last knife removing two strips. The pineapple is then passed through a rotary cylindrical cutter conventional in the art for separating the central cylinder from the outside strips of the meat, which latter may be cut into tidbits either during or after the last operation.

It will be noted that due to the hinging of the elbows and the yielding pressure of the springs 13 and the action of the springs 11 the peeling knives naturally adjust themselves to the shape and size of the pineapples and follow the contour lines thereof, and that, within reasonable limits, different sizes and shapes of pineapples may be peeled and prepared for canning in the same machine.

I claim:

1. A peeling knife for a pineapple or the like comprising a blade adapted to pass through the pineapple shell in a radial plane, a guide projecting from both sides of the blade in spaced and parallel relation to the cutting edge and a second blade secured transversely to the bottom edge of the first blade and substantially in alignment therewith.

2. A peeling knife for a pineapple or the like comprising a blade adapted to pass through the pineapple shell in a radial plane, a guide projecting from both sides of the blade in spaced and parallel relation to the cutting edge and a second blade secured transversely to the bottom edge of the first blade and substantially in alignment therewith, the second blade being dished to conform substantially to the outline of the pineapple.

3. A peeling knife for a pineapple or the like comprising a blade adapted to pass through the pineapple shell in a radial plane, a guide projecting from both sides of the blade in spaced and parallel relation to the cutting edge and a second blade secured transversely to the bottom edge of the first blade and substantially in alignment therewith, the spacing between the guide and the blade edge being substantially equal to the thickness of a pineapple shell.

4. A peeling knife for a pineapple or the like, comprising a blade and means for passing the same underneath the shell of a pineapple for separating the shell from the meat of the pineapple, the said means including a central guide blade passing through the pineapple shell in advance of the first blade, and means for pivotally supporting the guide blade on a transverse axis.

5. A peeling knife of the character described, comprising an elongated blade, a transverse pivot for supporting the blade intermediate its length, and a transverse trailing blade secured to the first blade rearwardly of the pivot, the bottom edge of the blade being curved upwardly forwardly of the pivot.

6. A peeling knife of the character described, comprising an elongated blade, a transverse pivot for supporting the blade intermediate its length, a transverse trailing blade secured to the first blade rearwardly of the pivot, yielding means urging the rear end of the blade downwardly and means for limiting upward movement of the front end of the blade.

ROBERT BROOKS TAYLOR.